(No Model.)
E. DÖRING & F. A. SIEGERT.
BICYCLE.
No. 417,550. Patented Dec. 17, 1889.
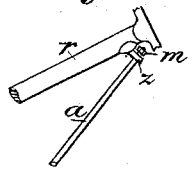
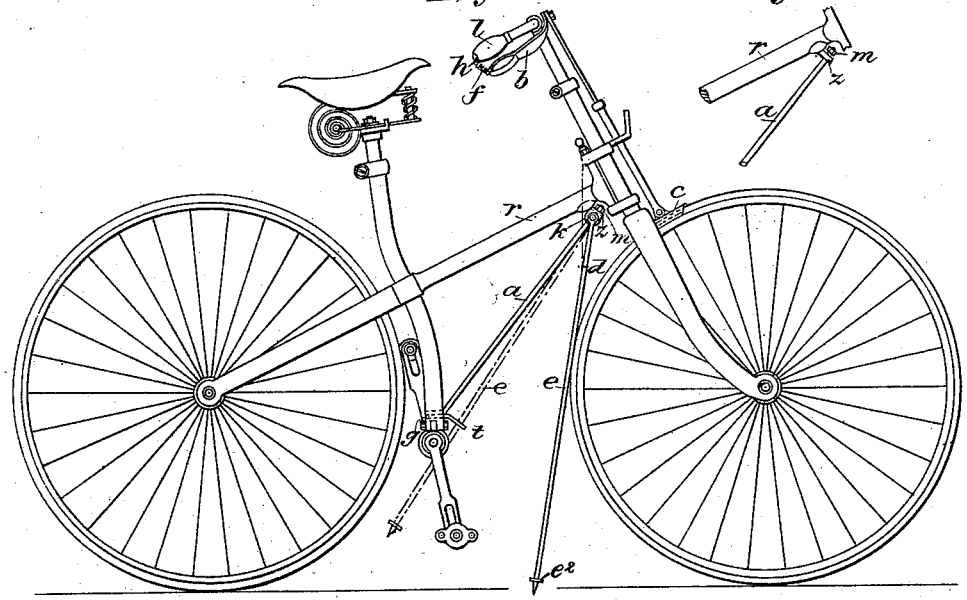
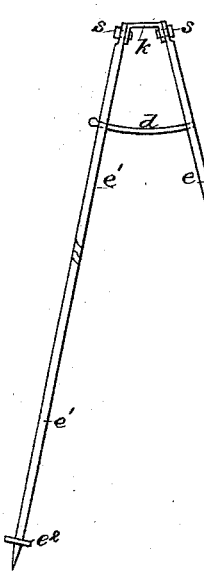
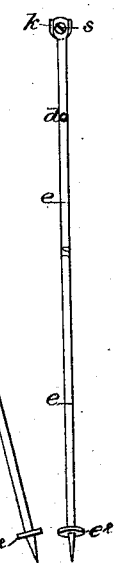
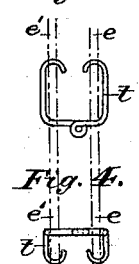
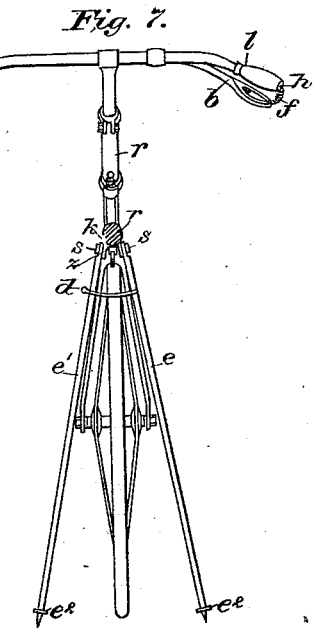
Witnesses:
T. C. Prechts
Robert Courtt
Inventors:
Emil Döring &
Friedrich A. Siegert,
By James L. Norris.
Attorney.

United States Patent Office.

EMIL DÖRING AND FRIEDRICH AUGUST SIEGERT, OF WEISTROPP, SAXONY, GERMANY.

BICYCLE.

SPECIFICATION forming part of Letters Patent No. 417,550, dated December 17, 1889.

Application filed September 3, 1889. Serial No. 322,870. (No model.)

*To all whom it may concern:*

Be it known that we, EMIL DÖRING, mechanician, and FRIEDRICH AUGUST SIEGERT, merchant, citizens of Germany, residing at Weistropp, in the Kingdom of Saxony, Germany, have invented certain new and useful Improvements in Bicycles; and we do hereby declare the following to be a full, clear, and exact description of the invention, such as will enable others skilled in the art to which it appertains to make and use the same.

This invention relates to bicycles, and has for its object to provide novel and efficient attachments for supporting the wheels in an upright position to render it unnecessary to lean the bicycle against buildings, trees, hedges, and similar objects, or stacking them one against another, thereby avoiding injury to the plated or otherwise ornamented or polished parts.

The object of the invention is accomplished by the features of construction and combination of devices hereinafter described and claimed, reference being made to the accompanying drawings, in which—

Figure 1 is a detail front elevation of the spring brace-rods for sustaining the bicycle. Fig. 2 is a side elevation of the same. Figs. 3 and 4 are detail views of the hooks for locking and carrying the brace-rods while the bicycle is in use. Fig. 5 is a side elevation of a bicycle with our invention applied thereto, some necessary parts of the bicycle being omitted to more clearly show the improvements. Fig. 6 is a detail view, and Fig. 7 is a sectional rear elevation.

In order to enable those skilled in the art to make and use our invention, we will now describe the same in detail, referring to the drawings, wherein—

The letter R indicates the usual backbone, and $a$ the bar connected at its upper end by the ear or projection $z$ and nut $m$ to the backbone, and at its lower end to the step-fork $g$, which carries the axle of the cranks. An angle-iron plate $k$, comprising two pendent lugs, is rigidly secured to the upper end of the backbone, and to the lugs are secured by pivots $s$ the flattened heads on the upper ends of the two brace-rods $e\ e'$, which at their lower ends are preferably pointed to engage the ground or the floor of a building, and are also provided with collars $e^2$, adjacent to the pointed extremities, to prevent undue penetration. The two brace-rods are connected by a metallic strap $d$, secured to one brace-rod $e$, passing through the other $e'$, and provided with a ball or other head to prevent the rod $e'$ from moving off the strap. The object of this construction is to hold the brace-rods from unduly spreading laterally or sidewise.

The brace-rods are of elastic metal, and when in the position shown by full lines they spread outward and support the bicycle on each side, as in Fig. 7. To prevent forward or backward movement of the bicycle when it is supported as stated, we provide the brake-handle $b$ with a spiral or other spring $f$, adapted to engage a hook $h$ on the steering-handle $l$ of the front fork, to retain the brake-handle in its elevated position, and thereby hold the brake $c$ in engagement with the rubber tire of the front wheel.

When the bicycle is to be used, the brace-rods are swung rearward and pressed toward each other, so that they can be sprung or snapped into hooks $t$ on the fork $g$. The hooks are preferably composed of a single piece of wire bent into two hooks, which project toward each other, as shown in Figs. 3 and 4. The brake-handle $b$ is provided with a spoon-like cavity to receive the spring $f$ when the latter is unhooked from the steering-handle $l$ of the front fork. The lugs of the angle-iron $k$ diverge downwardly, and consequently tend to spread the brace-rods in a direction away from each other, in such manner that the rods are locked in engagement with the hooks, and when disengaged therefrom they will swing forward and spring laterally outward or sidewise into the position required to support the wheels upright.

The improvements are shown applied to a certain type of bicycle; but obviously the construction of the latter is immaterial so long as there is provision for our attachments.

The spring construction of the brace-rods is very desirable, for that they not only snap into the hooks and are thereby securely held against accidental disengagement, but when released they automatically spring outward to secure the required spread for sustaining the bicycle.

Having thus described our invention, what we claim is—

1. The combination, with a bicycle having its backbone provided with an angle-iron comprising two diverging lugs, of the fork $g$, depending from the backbone, carrying the crank-axle and provided with a pair of hooks $t$, and two elastic brace-rods $e$ $e'$, pivoted to the diverging lugs and capable of springing together and snapping into the hooks on the crank-axle fork, substantially as described.

2. The combination, with a bicycle having a backbone, of two outwardly-springing brace-rods pivotally joined to the backbone and loosely connected by a strap which limits their spreading movement, and hooks into which the brace-rods can be snapped by springing the latter toward each other, substantially as described.

3. A bicycle having rear hooks, a pair of pivoted brace-rods to engage the ground or a floor for sustaining the wheels upright, a steering-handle, and a brake-handle having a spring to detachably connect with the steering-handle for holding the brake in engagement with the wheel-tire, substantially as described.

In testimony whereof we affix our signatures in presence of two witnesses.

EMIL DÖRING.
FRIEDRICH AUGUST SIEGERT.

Witnesses:
EMIL DOMSCH,
CARL FR. KEICHELT.